United States Patent [19]

Uemura

[11] 4,039,320
[45] Aug. 2, 1977

[54] REDUCING MATERIAL FOR STEEL MAKING

[75] Inventor: Masazi Uemura, Ando, Japan

[73] Assignees: Aikoh Co., Ltd., Tokyo; Sumitomo Metal Industries, Ltd., Osaka, both of Japan

[21] Appl. No.: 667,617

[22] Filed: Mar. 17, 1976

[30] Foreign Application Priority Data

Mar. 25, 1975 Japan .................................. 50-36381

[51] Int. Cl.$^2$ .............................................. C21C 7/02
[52] U.S. Cl. ......................................... 75/58; 75/53
[58] Field of Search .......................... 75/53, 55, 57, 58

[56] References Cited

U.S. PATENT DOCUMENTS 3,537,842   11/1970   Holland .................................. 75/58

*Primary Examiner*—P. D. Rosenberg
*Attorney, Agent, or Firm*—Wenderoth, Lind & Ponack

[57] ABSTRACT

During the reducing period in steel making, particularly in the making of stainless steel, the reduction of oxides in the slag and desulphurization of the molten steel are promoted by adding a reducing material, which is prepared by mixing uniformly aluminum powder and lime and the, like and compression molding the mixture into a desired shape.

4 Claims, No Drawings

REDUCING MATERIAL FOR STEEL MAKING

BACKGROUND OF THE INVENTION

This invention relates to a reducing material for use in steel making, particularly in the making of stainless steel to promote reduction of oxides of such metals as iron, chromium and the like and desulphurization of the molten steel, to thereby improve the steel quality and production efficiency.

In the reducing period of the refining process in stainless steel making, silicon is normally added as a reducing material to remove oxygen supplied in excess during the preceding oxidizing period and to reduce the oxidized alloying elements such as Cr, Mn and Fe. The addition of silicon, however, causes production of silicon oxide, which reduces basicity of the slag thereby impeding the desulphurization.

On the other hand, in order to carry out the reducing process effectively it is essential to add silicon in a certain excessive quantity and in order to maintain the basicity of the slag at a proper level a considerable quantity of lime and the like is needed. Addition of such a considerable quantity of lime and the like increases the quantity of slag, makes control of Si content in the molten steel difficult and thus interferes with the steel making operation.

Further, when metallic aluminum having a higher reducibility than silicon is added in an uncoated state, the metallic aluminum will violently react with oxygen in the air in the high temperature atmosphere and will be rapidly consumed contributing little to reduction of the oxides in the slag and desulphurization of the molten steel.

SUMMARY OF THE INVENTION

Accordingly, an object of this invention is to provide a reducing material for use in steel making, particularly in making stainless steel, to increase basicity of the slag and to enhance desulphurization of the molten steel during the reducing period.

Another object of this invention is to provide a reducing material for steel making molded in a desired size.

The reducing material according to this invention is prepared by mixing 20–50% aluminum and 40–80% lime and the like (the term "lime and the like" is used herein to generally designate lime stone and quick lime) and molding the mixture in a desired size so as to permit aluminum to efficiently act as a reducing agent for steel making. By addition of the reducing material according to this invention, aluminum protected by the lime and the like is substantially prevented from burning by the reaction with the oxygen in the air and is immediately melted into the slag to reduce oxides in the slag. It has been known that the slag including CaO and $Al_2O_3$ in the ratio 50 50 has the melting point of about 1390° C which is the lowest melting point of the slag having similar compositions. To make a highly reactive slag is to make a highly fluid slag or a slag having a low melting point. This invention, therefore, contemplates providing a reducing material which maintains the melting point of the slag in the range 1500° C or lower when aluminum in the reducing material reduces the oxides in the slag by making itself aluminum oxide and melts with lime and the like in the vicinity into the slag. In the reducing period of the steel making process, the melted slag produced in the preceding steps is floating in a layer on the surface of the molten steel. In the heretofore employed silicon reduction, refining can be rendered only when the melting point of the slag after addition of the reducing agent thereto is in the range of from about 1500° C to about 1700° C. In contrast to this, however, by using the reducing material according to this invention the melting point of the slag, after addition of the reducing material thereto, can be maintained in the range of about 1500° C or lower. Therefore, highly fluid slag can be always provided when the temperature of the molten steel is about 1700° C. Accordingly, while the constituents of the slag produced in the heretofore-employed silicon reduction are in the ranges, $SiO_2$ 38–45%, $Al_2O_3$ 3–8% and CaO 50–55%, the slag constituents when the present reducing material is used are in much wider ranges, $SiO_2$ 10–35%, $Al_2O_3$ 20–50% and CaO 32–50%. For this reason, in the heretofore-employed silicon reduction, the furnace condition changes sensitively responsive to the change in the slag composition accordingly, the steel making operation requires highly skilled operators. In this invention, however, standard operation can be easily performed and the reduction of the slag is expedited since the slag produced thereby is highly fluid. Thus, this invention facilitates the operation, reduces the time required for steel making, stabilizes the operation, increases the yield of the substances recovered from the slag and improves the desulphurizing effect. In order to allow these effects to be fully exhibited, the reducing material according to this invention is compounded in the range, aluminum 20–50% and lime and the like 40–80%. The percentages of these components are selected according to the steel making conditions and their quantities are determined so that the slag constituents are in the wider ranges recited hereinabove.

In order to achieve the above-described effects, while it is preferable to use the components of the reducing material, namely aluminum and lime and the like in as high purity as possible, most of these commercially available components may be used only if the contents of the impurities are maintained in such ranges as aluminum oxide less than 5%, silica less than 1%, iron oxide less than 1% and carbon less than 1%. The contents of aluminum and lime and the like in the reducing material according to this invention, outside the foregoing composition range, is not preferable since the aluminum content less than 20%, the lower limit of the range, does not produce sufficient reducing reaction. An aluminum content of more than 50%, the upper limit of the range, does not provide a better effect but only increases the production costs. Also, if the content of lime and the like less than 40% it is difficult to maintain the slag basicity at a proper level and if the content is more than 80% the slag basicity is too high to maintain the fluidity of the slag and thereby decrease the desulphurizing effect.

Before molding, aluminum preferably has the particle size distribution, Tyler's 10–20 mesh (1.65–0.83 mm) 75% or more, larger than 10 mesh less than 5% and smaller than 20 mesh less than 20%, and lime and the like must have the particle size of Tyler's 10 mesh (1.65 mm) or a larger mesh number. These materials are uniformly mixed and compression molded as by the pressure of 150–200 Kg/cm² into a cylindrical shape of a suitable size such, for example, as diameter 40–60 mm and axial length 20–30 mm. The shape and size to which the reducing material is to be molded may be changed according to the operational conditions and requirements.

DESCRIPTION OF THE PREFERRED EMBODIMENT

A specific example of this invention will now be described in which the reducing material according to this invention was used in refining a stainless steel JIS-SUS 304 (A1S1 304, BS304S15, DINX5CrNi18, NF Z5CN18) in a 50 ton electric arc furnace. The reducing material was prepared according to this invention by mixing 30% aluminum and 70% quick lime and compression molding the mixture into a cylindrical shape of the size, diameter 50 mm and axial length 25 mm. by the pressure of $_{150}Kg/cm^2$. The reducing material thus prepared was introduced into the molten steel at the rate of 10 Kg/ton (molten steel) immediately after the decarburization in the reducing period and maintained at the temperature 1800° C for about 10 minutes until the material was completely melted into the slag. The reducing reaction lasted for 20 minutes after the reducing material was added and then terminated. Thus, 60 charges of refining were performed using the reducing material according to this invention. In comparison to this, on the other hand, the conventional silicon chromium (40 silicon-30 chromium alloy) was used at the rate 9 Kg/ton (molten steel) in 60 charges with other conditions unchanged.

The average results of the comparative tests are shown in the following table:

| Furnace Analysis | Reducing Material of This Invention | Conventional Reducing Material |
| --- | --- | --- |
| S-Content of Steel (%) | 0.006 – 0.007 | 0.008 – 0.009 |
| Tapping Yield (%) | 97.4 | 96.5 |
| Cr-Recovery (%) | 96.0 | 94.5 |
| Processing Capacity (T/H) | 18.5 | 17.3 |
| Slag Composition, $Cr_2O_3$ (%) | 4.86 | 15.0 |
| Slag Composition, FeO (%) | 0.72 | 3.28 |
| Slag Composition, CaO (%) | 37.1 | 29.3 |
| Slag Composition, MgO (%) | 10.4 | 12.8 |
| Slag Composition, $SiO_2$ (%) | 20.8 | 28.0 |
| Slag Composition, $Al_2O_3$ (%) | 11.2 | 2.80 |
| Slag Composition, basicity $\left(\frac{CaO + MgO}{SiO_2}\right)$ (%) | 2.28 | 1.50 |

As obvious from the above table, according to this invention, the desulphurizing effect was 0.001–0.003% lower, tapping yield was about 1% higher, chromium recovery ratio was 1.5% higher and processing capacity was about 1 T/H better due to the material reduction in processing time than in the conventional practice. In the property of the slag produced when the reducing material according to this invention was used, the content of $Cr_2O_3$ was low and the basicity was maintained at the proper level to enhance the desulphurizing effect.

While we have described specific embodiments of our invention, it will be understood that these embodiments are merely for the purpose of description and that various other forms may be devised within the scope of our invention as defined in the appended claims.

I claim:

1. A reducing material for steel making, consisting essentially of 20–50% aluminum and 40–80% lime, said substances being uniformly mixed together and molded into a desired size such that the aluminum is substantially protected from exposure to the atmosphere.

2. A reducing material for steel making as set forth in claim 1, wherein aluminum powder and lime and the like are uniformly mixed together and compression molded into a cylindrical shape of a desired size.

3. A reducing material for steel making according to claim 1, wherein the aluminum is in the form of a powder having a particle size distribution such that 75% or more of the powder has a Tyler's 10–20 mesh size (1.65–83mm), less than 5% has a Tyler's 10 mesh size or larger, less than 20 % has a Tyler's 20 mesh size or smaller; and wherein the lime has a particle size such that it has a Tyler's 10 mesh size or higher mesh number.

4. A reducing material for steel making as set forth in claim 1, wherein the lime is present in an amount of 70% and the aluminum in an amount of 30%.

* * * * *